United States Patent
Shinotsuka et al.

(10) Patent No.: US 7,486,322 B2
(45) Date of Patent: Feb. 3, 2009

(54) LIGHT SENSOR CIRCUIT HAVING SOURCE/DRAIN VOLTAGE CHANGING-OVER CIRCUIT TO MINIMIZE AFTERGLOW

(76) Inventors: Sukeyuki Shinotsuka, c/o 10 Banch 1, 1-chome, Shinsayama, Sayama-shi, Saitama (JP); Katsuhiko Takebe, c/o 10 Banch 1, 1-chome, Shinsayama, Sayama-shi, Saitama (JP)

( * ) Notice: Subject to any disclaimer, the term of this patent is extended or adjusted under 35 U.S.C. 154(b) by 1008 days.

(21) Appl. No.: 10/471,522

(22) PCT Filed: Mar. 1, 2002

(86) PCT No.: PCT/JP02/01908

§ 371 (c)(1),
(2), (4) Date: Mar. 18, 2004

(87) PCT Pub. No.: WO02/073956

PCT Pub. Date: Sep. 19, 2002

(65) Prior Publication Data

US 2004/0149889 A1 Aug. 5, 2004

(30) Foreign Application Priority Data

| Mar. 9, 2001 | (JP) | ............................ 2001-116117 |
| Mar. 9, 2001 | (JP) | ............................ 2001-116119 |
| May 11, 2001 | (JP) | ............................ 2001-180837 |

(51) Int. Cl.
*H04N 5/335* (2006.01)
*H04N 3/14* (2006.01)
*G01J 1/44* (2006.01)

(52) U.S. Cl. ................. 348/308; 250/214 L; 250/214.1; 348/294

(58) Field of Classification Search ................. 348/308, 348/311; 250/214 L
See application file for complete search history.

(56) References Cited

U.S. PATENT DOCUMENTS 5,241,575 A * 8/1993 Miyatake et al. .............. 377/60

(Continued)

FOREIGN PATENT DOCUMENTS

JP 5-219443 8/1993

(Continued)

OTHER PUBLICATIONS

Japanese Journal of Institute of TV Engineers, vol. 49 1995) entitled "Logarithmic-Converting CCD Line Sensor".

*Primary Examiner*—Ngoc-Yen T Vu
*Assistant Examiner*—Paul Saunders
(74) *Attorney, Agent, or Firm*—Fulbright & Jaworski LLP

(57) ABSTRACT

Disclosed is a light sensor circuit which works by producing in a photoelectric converting element a photo current proportional to a quantity of incident light falling thereon, converting the photo current into a voltage signal by using a threshold region characteristic of a transistor with a logarithmic output characteristic in a weak inverse state and producing a sensor output corresponding to the voltage signal. The light sensor circuit is provided with an initializing means for removing an electric charge remaining in a parasite capacitor of the photoelectric converting element before detecting light by the same element, thereby achieving a wide dynamic range and obtaining a sensor signal with no afterglow even if it works with a small quantity of incident light.

1 Claim, 20 Drawing Sheets

U.S. PATENT DOCUMENTS

| | | | |
|---|---|---|---|
| 6,967,682 B1 * | 11/2005 | Hagihara | 348/308 |
| 6,999,122 B1 * | 2/2006 | Hagihara et al. | 348/308 |
| 7,030,921 B2 * | 4/2006 | Hagihara et al. | 348/308 |
| 7,164,443 B1 * | 1/2007 | Hagihara | 348/308 |
| 7,176,435 B2 * | 2/2007 | Shinotsuka et al. | 250/214 L |

FOREIGN PATENT DOCUMENTS

| | | |
|---|---|---|
| JP | 7-46481 | 2/1995 |
| JP | 2000-329616 | 11/2000 |
| JP | 2000329616 A * | 11/2000 |

* cited by examiner

-- PRIOR ART --

-- PRIOR ART --

-- PRIOR ART --

US 7,486,322 B2

LIGHT SENSOR CIRCUIT HAVING SOURCE/DRAIN VOLTAGE CHANGING-OVER CIRCUIT TO MINIMIZE AFTERGLOW

BACKGROUND OF THE INVENTION

The present invention relates to a light sensor circuit which is used as a unit pixel of an image sensor and is capable of producing in a photoelectric converting element a photo current (photo current) proportional to a quantity of incident light, converting it into a sensor signal with a logarithmic characteristic and outputting the converted sensor signal.

There has been developed a conventional light sensor circuit having a wide dynamic range, which comprises, as shown in FIG. 1, a photo-diode PD operating as a photoelectric converting element for producing a photo current Ip proportional to the quantity of incident light Ls falling thereon, a transistor Q1 having a logarithmic output characteristic in a weak inverse state for converting the photo current produced in the photodiode into a voltage signal Vpd by using its sub-threshold region characteristic and a charge coupled device (CCD) for outputting a sensor signal by transferring an electric charge in accordance with the voltage signal Vpd (a CCD line sensor having a logarithmically converted characteristic, Japanese Journal of Institute of Image Information and Television Engineers, vol. 49: pp. 169-173 (1995).

FIG. 2 shows an equivalent circuit of the light sensor circuit of FIG. 1.

The light sensor circuit thus constructed requires time to charge and discharge a parasite capacitor Cp of the photodiode and therefore accumulates a remaining charge therein if the quantity of incident light absurdly decreased for instance by changing a state of illumination from bright to dark. An image sensor composed of the above-described light sensor circuits may suffer occurrence of afterglows due to the remaining charges.

In Japanese Laid-Open Publications Nos. 5-219443 (1993) and 7-46489 (1995), there are disclosed image sensors using a number of light sensor circuits each representing a unit pixel, which is capable of producing in a photodiode a photo current proportional to a quantity of incident light falling thereon and converting the photo current into a voltage signal by using a sub-threshold characteristic of a MOS transistor having a logarithmic output characteristic in a weak inverse state and a fixed gate voltage. These image sensors can exhibit a complete logarithmic output characteristic attaining a wide dynamic range. However, these image sensors may suffer the occurrence of an afterglow of a moving bright point on a display screen.

Japanese Laid-Open Patent Publication No. 2000-329616 discloses another embodiment of a conventional MOS transistor type image sensor using a number of light sensor circuits each representing a unit pixel, which circuit comprises, as shown in FIG. 35, a photodiode PD operating as a photoelectric converting element for producing a photo current proportional to a quantity of incident light Ls falling thereon, a transistor Q1 having a logarithmic output characteristic in a weak inverse state for converting the photo current produced in the photodiode into a voltage signal Vpd by using its sub-threshold region characteristic, a transistor Q2 for amplifying the voltage signal Vpd and a transistor Q3 for outputting a sensor signal in accordance with a timing pulse of a readout signal Vs and which circuit is featured by its wide dynamic range obtained by giving the output a logarithmic characteristic, thereby achieving the high sensitivity of detecting a light signal. In addition, the light sensor circuit is provided with a means for changing a drain voltage VD of the transistor Q1 to a value lower than a normal level value for a specified period to remove a charge accumulated in a parasitic capacity C of the photodiode PD to initialize the circuit. The light sensor circuit can thus obtain a voltage signal Vpd corresponding to the quantity of incident light Ls even if the photo current absurdly changed, thereby eliminating the possibility of occurrence of an afterglow of the pixel even at a small quantity of incident light. However, the above-described light sensor circuit requires the provision of a voltage changing-over circuit for changing-over the power source voltage with low impedance step by step in order to change the drain voltage of the transistor to a value lower than the normal when initializing the light sensor circuit. As a result of this, the circuit configuration of the light sensor circuit is complicated.

SUMMARY OF THE INVENTION

An object of the present invention is to provide a light sensor circuit for use in an image sensor, which comprises a MOS transistor for converting a photo current produced in a photoelectric converting element in proportion to a quantity of incident light falling thereon into a voltage signal with a logarithmic output characteristic in a weak inverse state and a CCD for outputting a sensor signal by transferring an electric charge corresponding to the converted voltage signal and which is provided with an initializing means for removing in advance an electric charge remaining in a parasite capacitor of the photoelectric converting element so as to immediately respond to an absurd change in quantity of incident light and produce a correct voltage signal proportional to the changed quantity of light.

Another object of the present invention is to provide a light sensor circuit which works by producing in a photoelectric converting element a photo current proportional to incident light falling thereon, converting it into a voltage signal by using a sub-threshold region characteristic of a transistor having a logarithmic output characteristic in a weak inverse state and outputting a sensor signal corresponding to the converted voltage signal and which is provided with an initializing means for removing an electric charge remaining in a parasite capacitor of the photoelectric converting element before detecting light so as to immediately produce a correct voltage signal corresponding to the quantity of incident light even if a photo current is absurdly changed, thus preventing the occurrence of an afterglow of the sensor signal with a small quantity of incident light.

A further object of the present invention is to provide a light sensor circuit which works by producing in a photoelectric converting element a photo current proportional to incident light falling thereon, converting it into a voltage signal by using a sub-threshold region characteristic of a transistor having a logarithmic output characteristic in a weak inverse state and outputting a sensor signal corresponding to the converted voltage signal and which has a switching-over transistor separately provided and exclusively used for charging/discharging a parasite capacitor of the photoelectric element for easier initialization of the element before detection of incident light, which eliminates the need of step-by-step changing a power source voltage of the transistor. Removing an electric charge remaining in the parasite capacitor of the photoelectric converting element of the light sensor circuit is achieved merely by switching ON the separate transistor before detecting a light signal by the light sensor circuit.

PREFERRED EMBODIMENTS OF THE PRESENT INVENTION

Figure 1:
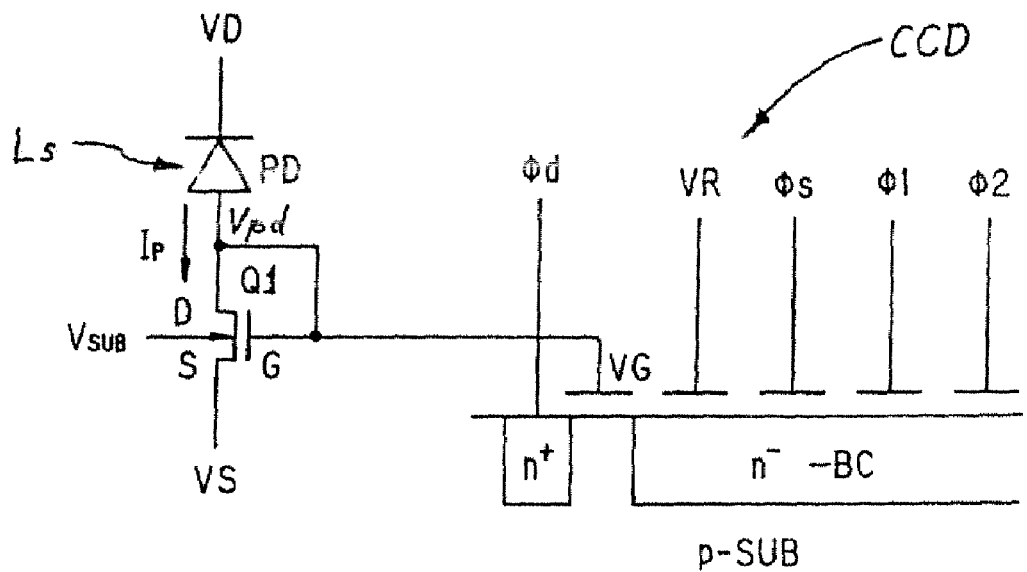
FIG. 1 is an electric circuit diagram of a conventional light sensor circuit.
Figure 2:
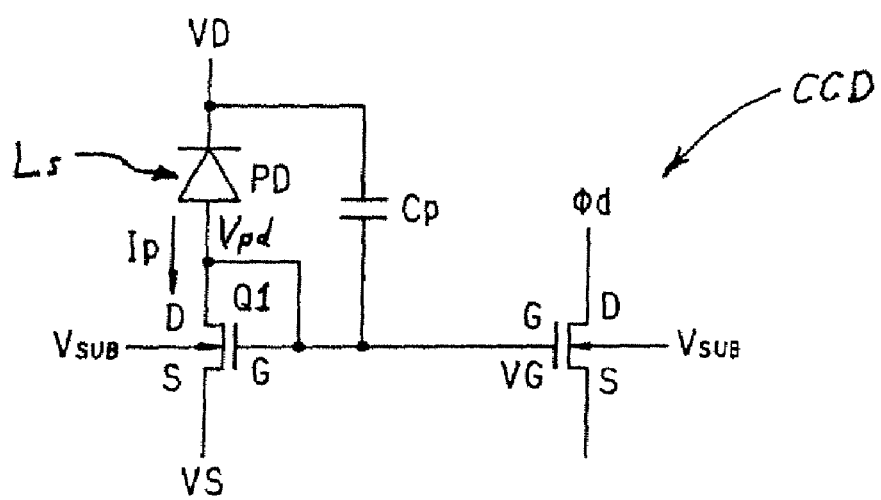
FIG. 2 is an equivalent electric circuit diagram of the light sensor circuit of FIG. 1.
Figure 3:
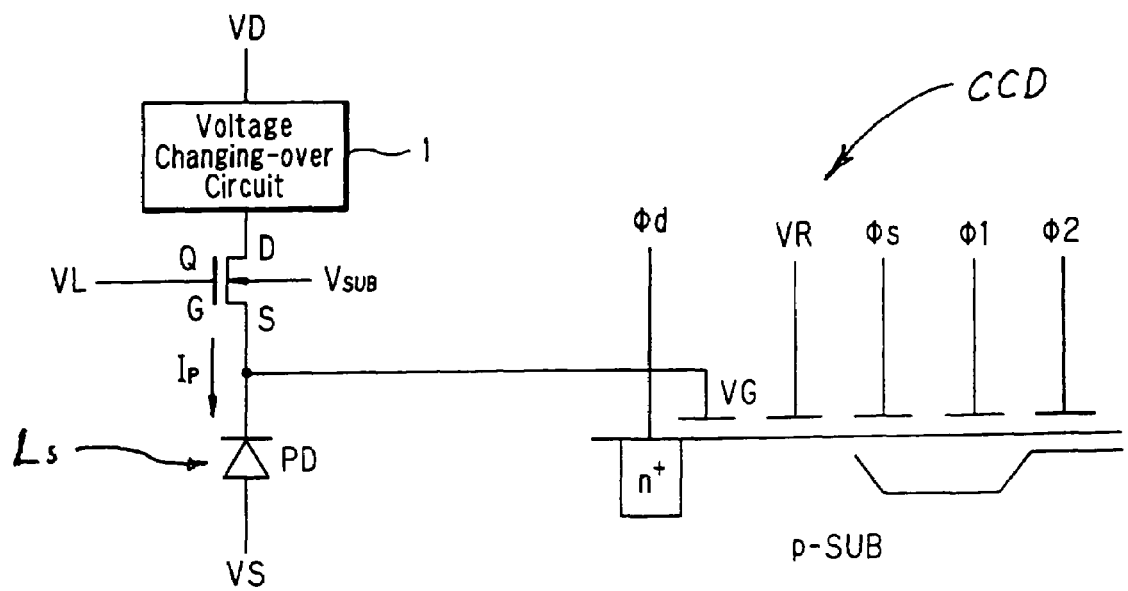
FIG. 3 is an electric circuit diagram of a light sensor circuit according to the present invention.

Referring to FIG. 3, a light sensor circuit according to the present invention, which comprises a MOS transistor Q having a logarithmic output characteristic in a weak inverse state for converting a photo current Ip produced in a photodiode PD in proportion to a quantity of incident light Ls falling thereon into a voltage signal and a CCD for transferring and outputting a signal charge corresponding to the voltage signal. The transistor Q is of n-MOS type with a fixed gate voltage and connected at its source side to the photodiode PD. The transistor Q is provided at its drain side with a voltage changing-over circuit 1 which is operated under control of a control unit (not shown) to change the drain voltage VD of the transistor Q to a level lower than a normal and keep it thereat for a specified period to remove an electric charge remaining in a parasite capacitor Cp (see FIG. 4) of the photodiode for initialization thereof before recharging for detecting incident light falling thereon.

Figure 4:
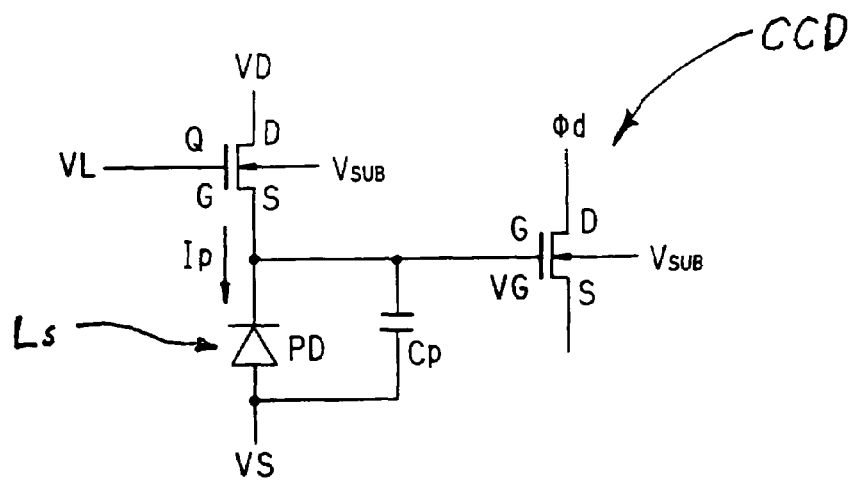
FIG. 4 is an equivalent electric circuit diagram of the light sensor circuit shown in FIG. 3.

FIG. 4 shows an equivalent circuit of the light sensor circuit shown in FIG. 3.

Figure 5:
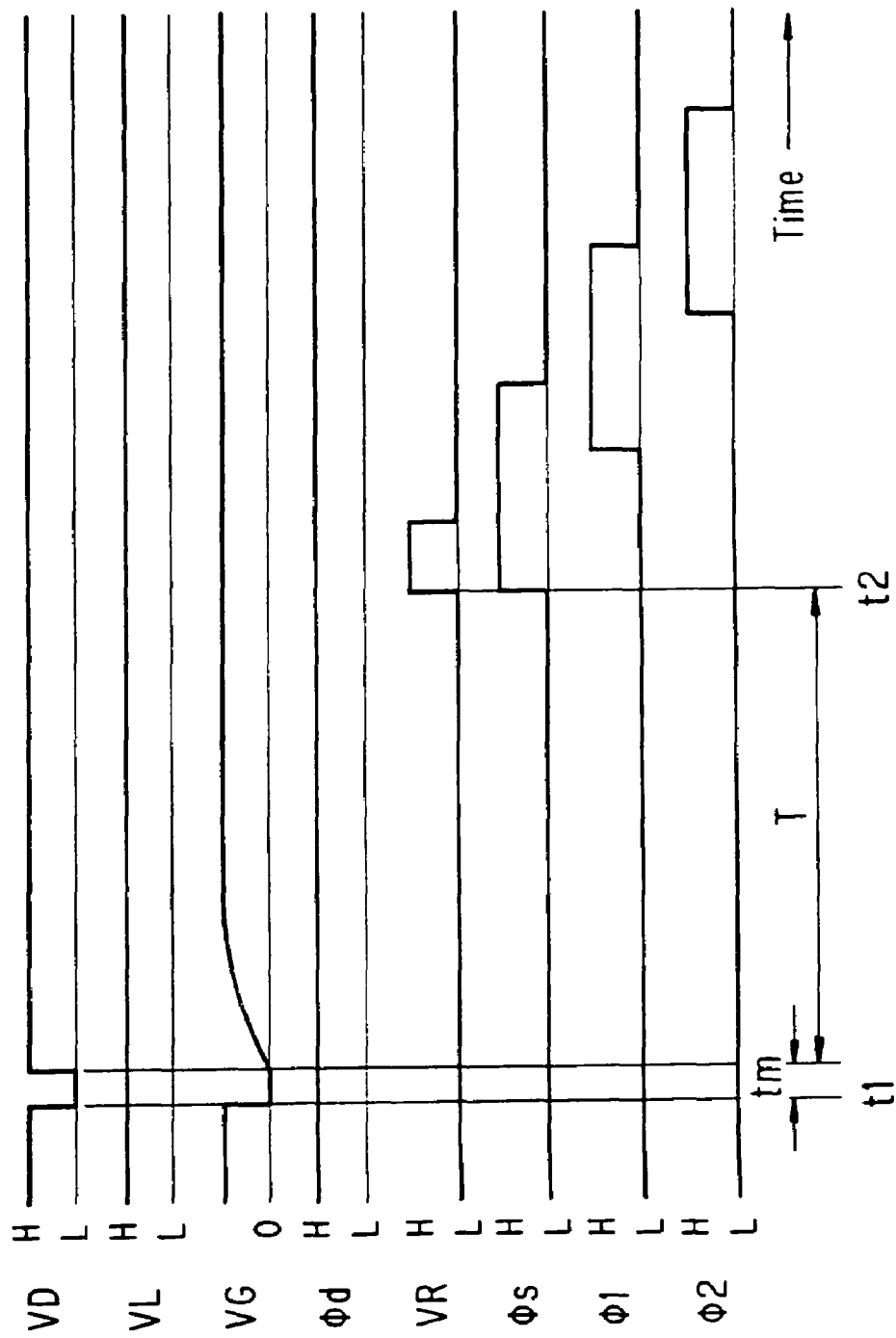
FIG. 5 is a time chart of signals produced at respective portions of the light sensor circuit shown in FIG. 4.

FIG. 5 shows a time chart of signals produced at respective portions of the light sensor circuit of FIG. 3. In FIG. 5, t1 is an initializing timing pulse and t2 is a light-signal detection timing pulse. A specified time tm for which the drain voltage VD of the transistor Q is switched from a high level H (normal value) to a lower level L (a value lower than the normal value) and kept thereat is set for example to about 5 microseconds in case of reading a pixel at a speed of about 100 nanoseconds. In FIG. 5, T designates a period for accumulating a charge in a parasitic capacitor Cp of the photodiode PD, which period is about 1/30 (or 1/60) seconds for a NTSC signal.

In the light sensor circuit thus constructed, once the drain voltage VD of the transistor Q1 was switched over at the initializing timing t1 to the low level L and kept thereat for a period tm for initializing the circuit, an electric charge remaining in the parasite capacitor Cp of the photodiode PD is discharged and, as the result, the gate voltage VG of the transistor Q1 in the equivalent circuit of the CCD (FIG. 4) is temporally decreased to a lower level L. After initialization, electric charges are accumulated again until the gate voltage VG increases to a voltage corresponding to a photocurrent Ip. When Gates (electrodes) VR and φs in the CCD reach a high level at light-signal detection timing t2, potential wells are formed one by one under electrodes VR and φs respectively and a signal charge corresponding to a photo current Ip is injected from the a gate φd through VG into the potential wells successively formed under the electrodes VR and φs. When the gate VR is then changed to the low level, the potential well under the gate VR disappears and the charge is accumulated in the potential well formed under the gate φs. Thereafter, the gates φ1, φ2 sequentially rises to the high level H causing a signal charge to move to a next potential well.

Figure 6:
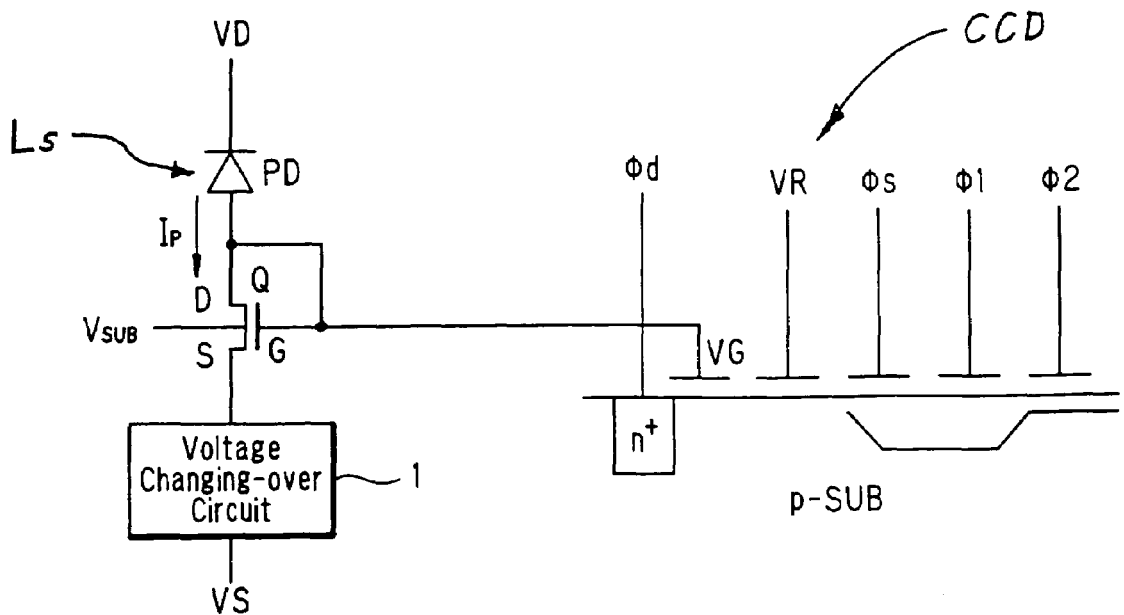
FIG. 6 is an electric circuit diagram of another embodiment of a light sensor circuit according to the present invention.

FIG. 6 shows another embodiment of a light sensor circuit according to the present invention. This light sensor circuit comprises a MOS transistor Q having a logarithmic output characteristic in a weak inverse state for converting a photo current Ip produced in a photodiode PD in proportion to a quantity of incident light Ls falling thereon into a voltage signal and a CCD for transferring and outputting a signal charge corresponding to the voltage signal. The transistor Q is of n-MOS type and connected at its drain D and gate G to an anode side of the photodiode PD. The transistor Q is provided at its source side S with a voltage switching-over circuit 1 which is used for changing a source voltage VS to a level higher than a normal and keeping it thereat for a specified period under control from a control unit (not shown) so as to remove an electric charge remaining in a parasite capacitor Cp (FIG. 7) of the photodiode for initialization thereof before accumulating an electric charge to be produced with incident light Ls.

Figure 7:
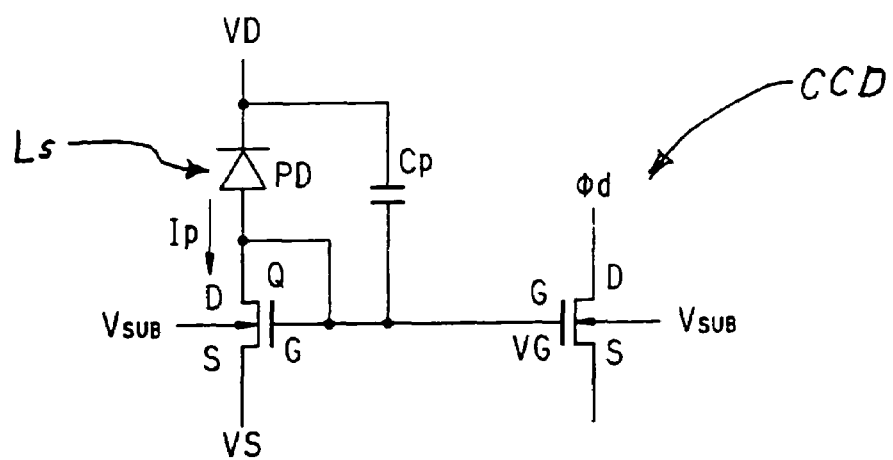
FIG. 7 is an equivalent electric circuit diagram of the light sensor circuit of FIG. 6.

FIG. 7 shows an equivalent circuit of the light sensor circuit shown in FIG. 6.

Figure 8:
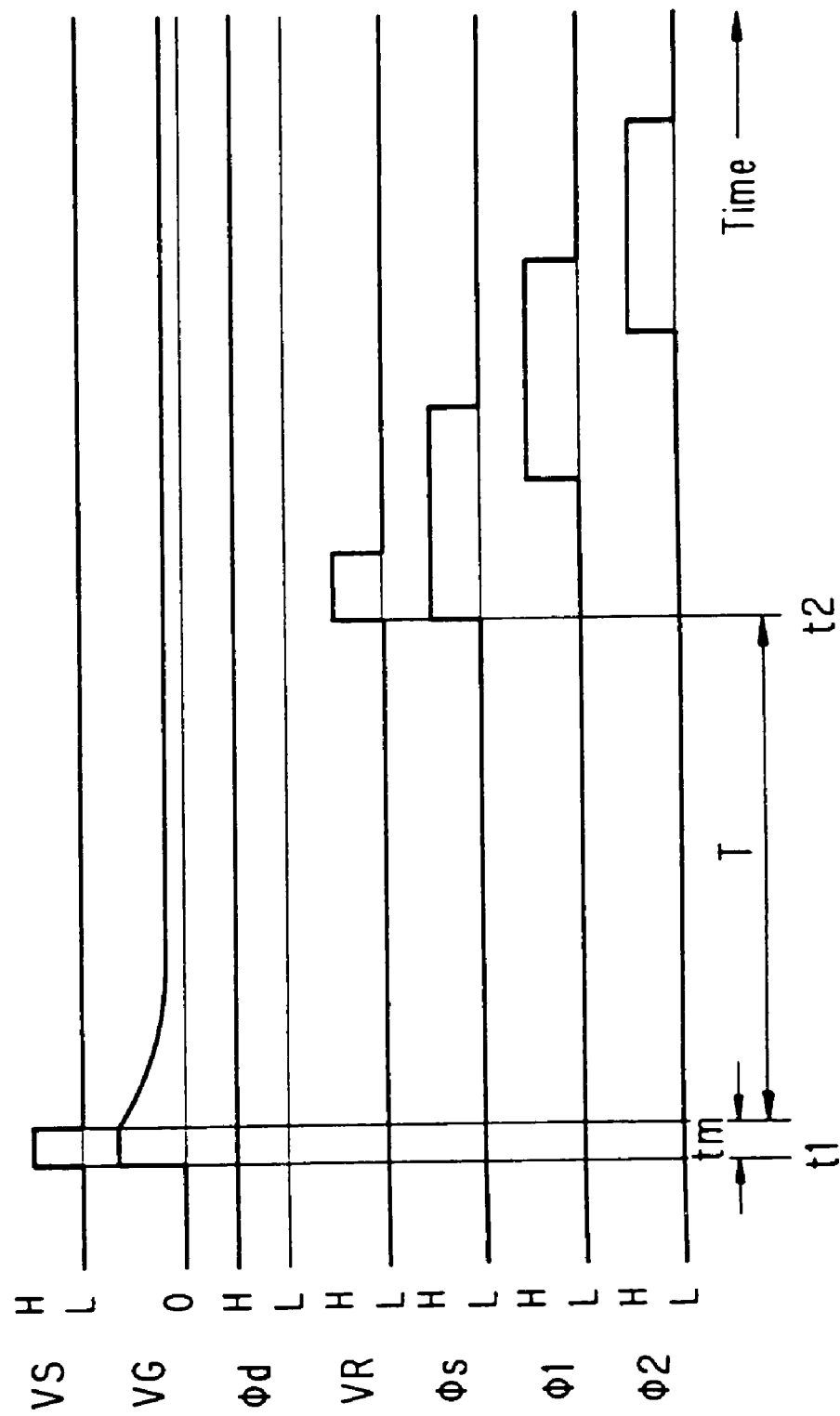
FIG. 8 is a time chart of signals produced at respective portions of the light sensor circuit shown in FIG. 6.

FIG. 8 shows a time chart of signals produced at respective portions of the light sensor circuit of FIG. 6. In FIG. 8, t1 is an initializing timing pulse and t2 is a light-signal detection timing pulse. A specified time tm for which the source voltage VS of the transistor Q is switched from a low level L (normal value) to a high level H (a value higher than the normal value) and kept thereat is set for example to about 5 microseconds in case of reading a pixel at a speed of about 100 nanoseconds.

In the light sensor circuit thus constructed, once the source voltage VS of the transistor Q was switched over at the initializing timing t1 to the high level H and kept thereat for a period tm for initializing the circuit, an electric charge remaining in the parasite capacitor Cp of the photodiode PD is removed and, as the result of this, the gate voltage VG of the transistor Q in the equivalent circuit of the CCD (FIG. 7) is temporally increased to the high level H. After initialization, electric charges are accumulated again until the gate voltage VG decreases to a voltage corresponding to a photocurrent Ip. When gates VR and φs in the CCD reach a high level H at light-signal detection timing t2, potential wells are formed one by one under electrodes VR and φs and, then, a signal charge corresponding to a photo current Ip is injected from the gate φd through VG into the potential wells sequentially formed under the electrodes VR and φs. When the gate VR is then changed over to the low level L, the potential well under the gate VR disappears and the charge is accumulated in the potential well formed under the gate φs. Thereafter, the potentials of gates φ1, φ2 sequentially rises to the high level H causing the signal charge to move to an adjacent higher potential well.

Figure 9:
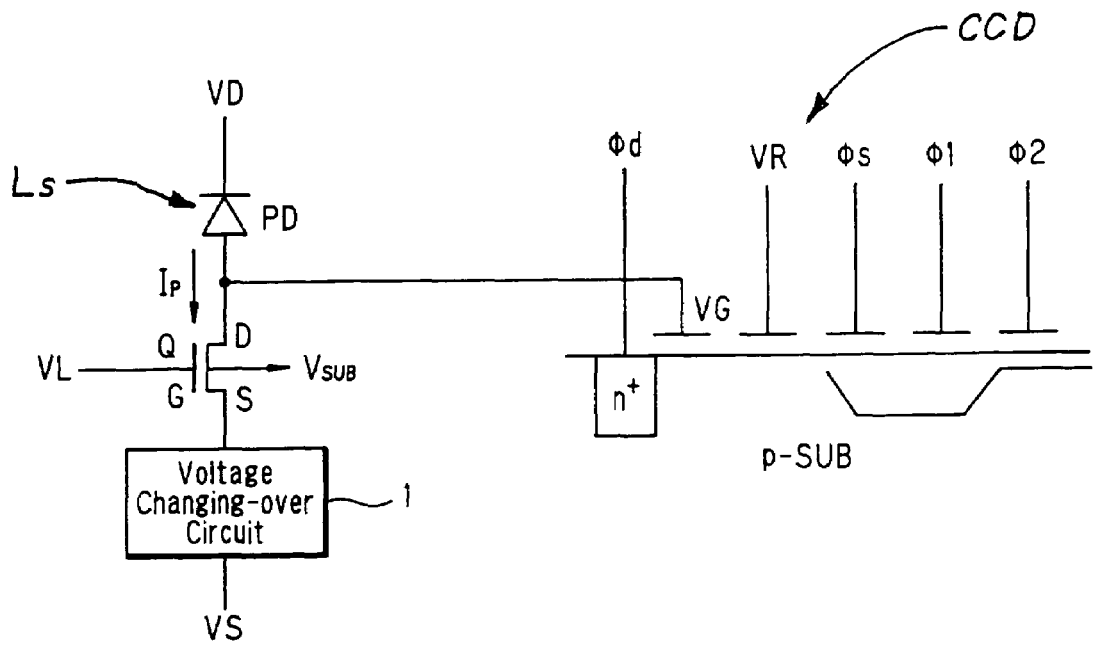
FIG. 9 is an electric circuit diagram of another embodiment of a light sensor circuit according to the present invention.

FIG. 9 shows another embodiment of a light sensor circuit according to the present invention. This light sensor circuit comprises a MOS transistor Q having a logarithmic output characteristic in a weak inverse state for converting a photo current Ip produced in a photodiode PD in proportion to a quantity of incident light Ls falling thereon into a voltage signal and a CCD for transferring and outputting a signal charge corresponding to the voltage signal. The transistor Q is of p-MOS type with a fixed gate and connected at its drain side D to the photodiode PD. The transistor Q is provided at its source side S with a voltage switching-over circuit 1 which is used for changing a source voltage VS to a value higher than normal and keeping it thereat for a specified period under control from a control unit (not shown) so as to remove an electric charge remaining in a parasite capacitor Cp (FIG. 10) of the photodiode for initialization thereof before accumulating an electric charge produced with incident light Ls detected.

Figure 10:
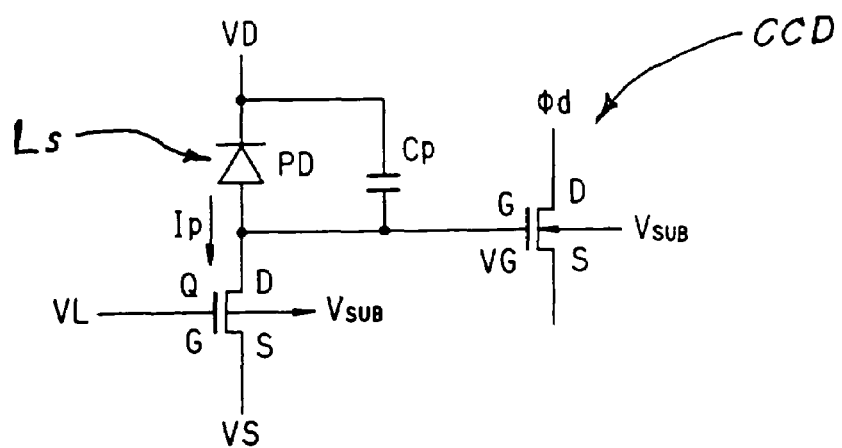
FIG. 10 is an equivalent electric circuit diagram of the light sensor circuit shown in FIG. 9.

FIG. 10 shows an equivalent circuit of the light sensor circuit shown in FIG. 9.

Figure 11:
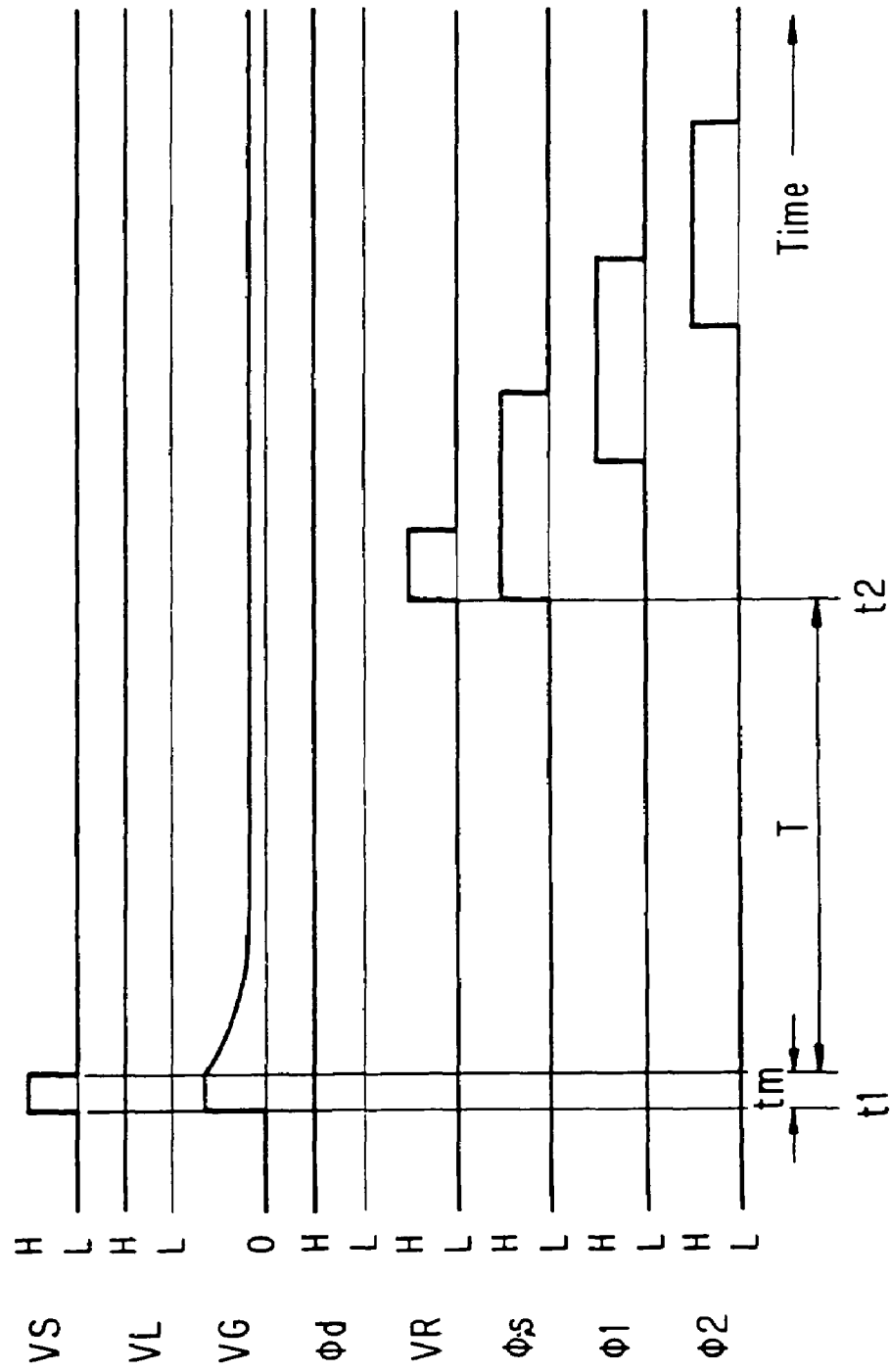
FIG. 11 is a time chart of signals produced at respective portions of the light sensor circuit shown in FIG. 9.

FIG. 11 shows a time chart of signals produced at respective portions of the light sensor circuit of FIG. 9. In FIG. 11, t1 is an initializing timing pulse and t2 is a light-signal detection timing pulse. A specified time tm for which the source voltage VS of the transistor Q is switched from a low level L (normal value) to a high level H (a value higher than the normal) and kept at the high level H is set for example to about 5 microseconds in case of reading a pixel at a speed of about 100 nanoseconds.

In the light sensor circuit thus constructed, once the source voltage VS of the transistor Q was switched over at the initializing timing t1 to the high level H and kept thereat for a period tm for initializing the circuit, an electric charge remaining in the parasite capacitor Cp of the photodiode PD is removed and, as the result of this, a gate voltage VG of the transistor Q in the equivalent circuit of the CCD (FIG. 10) is temporally increased to the high level H. After initialization, electric charges are accumulated again until the gate voltage VG decreases to a voltage corresponding to a photocurrent Ip. When gates VR and φs in the CCD reach the high level H at the light-signal detection timing t2, potential wells are formed one by one under electrodes VR and φs and, then, a signal charge corresponding to a photo current Ip is injected from the gate φd through VG into the potential wells sequentially formed under the electrodes VR and φs. When the gate VR is then changed over to the low level L, the potential well under the gate VR disappears and the charge is accumulated in the potential well formed under the gate φs. Thereafter, the gates φ1, φ2 sequentially rise to the high level H to transfer the charge to an adjacent higher potential well.

Figure 12:
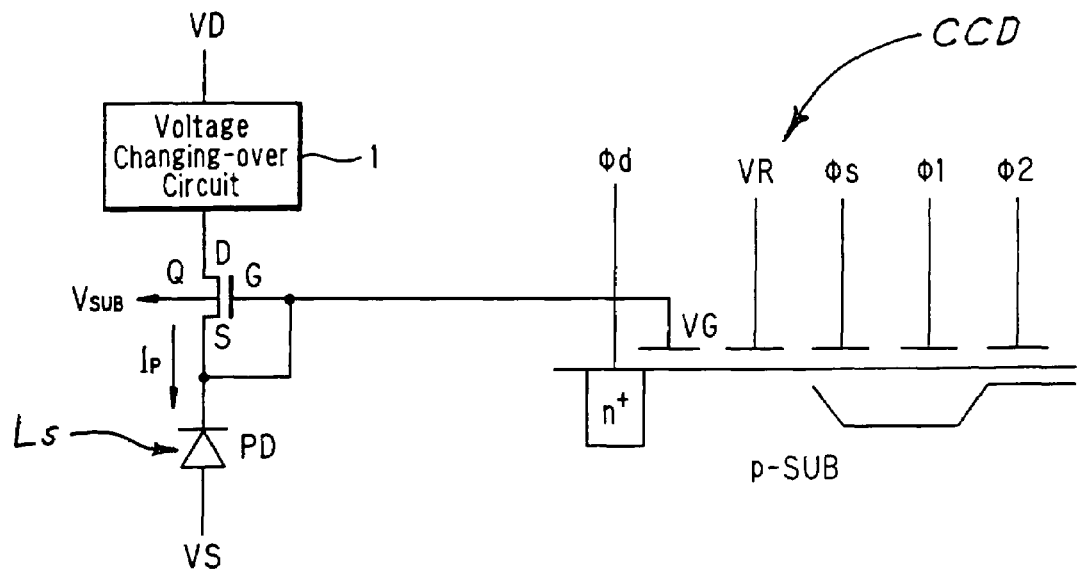
FIG. 12 is an electric circuit diagram of another embodiment of a light sensor circuit according to the present invention.

FIG. 12 shows another embodiment of a light sensor circuit according to the present invention. This light sensor circuit comprises a MOS transistor Q having a logarithmic output characteristic in a weak inverse state for converting a photo current Ip produced in a photodiode PD in proportion to a quantity of incident light Ls falling thereon into a voltage signal and a CCD for transferring and outputting a signal charge corresponding to the voltage signal. The transistor Q is of p-MOS type and connected at its source S and Gate G to an anode side of the photodiode PD. The transistor Q is provided at its drain side D with a voltage switching-over circuit 1 which is used for changing a drain voltage VD to a level lower than a normal and keeping it thereat for a specified period under control from a control unit (not shown) so as to remove an electric charge remaining in a parasite capacitor Cp of the photodiode for initialization thereof before accumulating an electric charge produced with incident light Ls detected.

Figure 13:
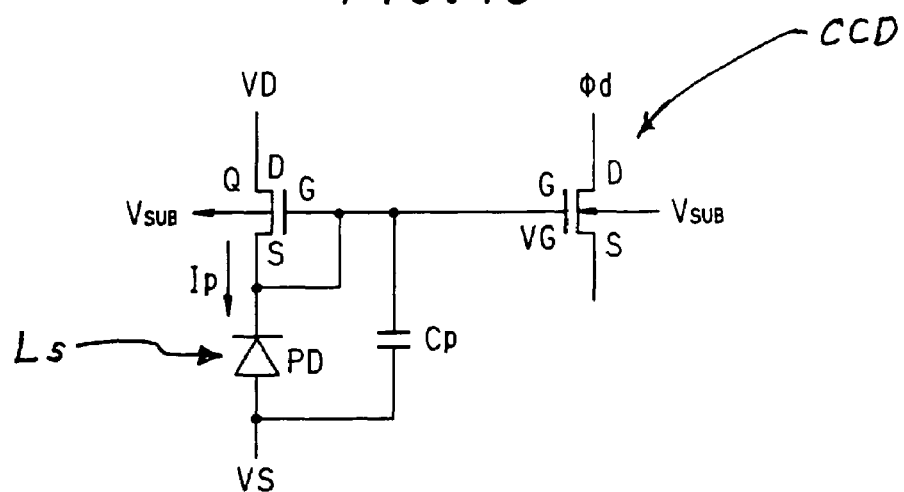
FIG. 13 is an equivalent electric circuit diagram of the light sensor circuit shown in FIG. 12.

FIG. 13 shows an equivalent circuit of the light sensor circuit shown in FIG. 12.

Figure 14:
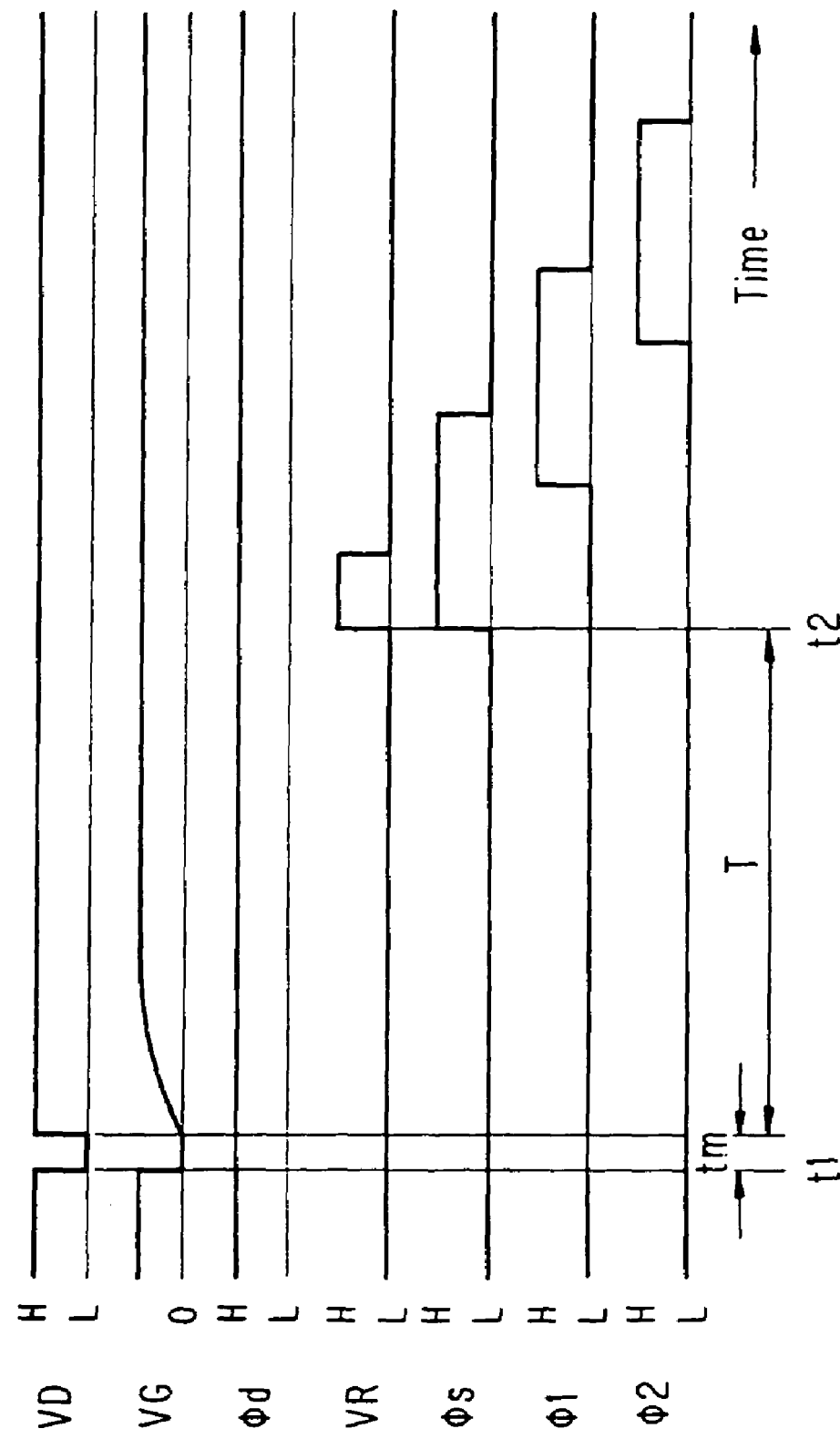
FIG. 14 is a time chart of signals produced at respective portions of the light sensor circuit shown in FIG. 12.

FIG. 14 shows a time chart of signals produced at respective portions of the light sensor circuit of FIG. 12. In FIG. 14, t1 is an initializing timing pulse and t2 is a light-signal detection timing pulse. A specified time tm for which the drain voltage VD of the transistor Q is switched from a high level H (normal value) to a low level L (a value lower than the normal) and kept thereat is set for example to about 5 microseconds in case of reading a pixel at a speed of about 100 nanoseconds.

In the light sensor circuit thus constructed, once the drain voltage VD of the transistor Q was switched over at the initializing timing t1 to the low level L and kept thereat for a period tm for initializing the circuit, an electric charge remaining in the parasite capacitor Cp of the photodiode PD is removed and, as the result of this, a gate voltage VG of the transistor Q in the equivalent circuit of the CCD (FIG. 13) is temporally decreased to the low level L. After initialization, electric charges are accumulated again until the gate voltage VG increases to a voltage corresponding to a photocurrent Ip. When gates VR and φs in the CCD reached the high level H at the light-signal detection timing t2, potential wells are formed one by one under electrodes VR and φs and, then, a signal charge corresponding to a photo current Ip is injected from the gate φd through VG into the potential wells formed under the electrodes VR and φs. When the gate VR is then changed over to the low level L, the potential well under the gate VR disappears and the charge is accumulated in the potential well formed under the gate φs. Thereafter, the gates φ1, φ2 sequentially rise to the high level H to transfer the charge to an adjacent higher potential wells.

Figure 15:
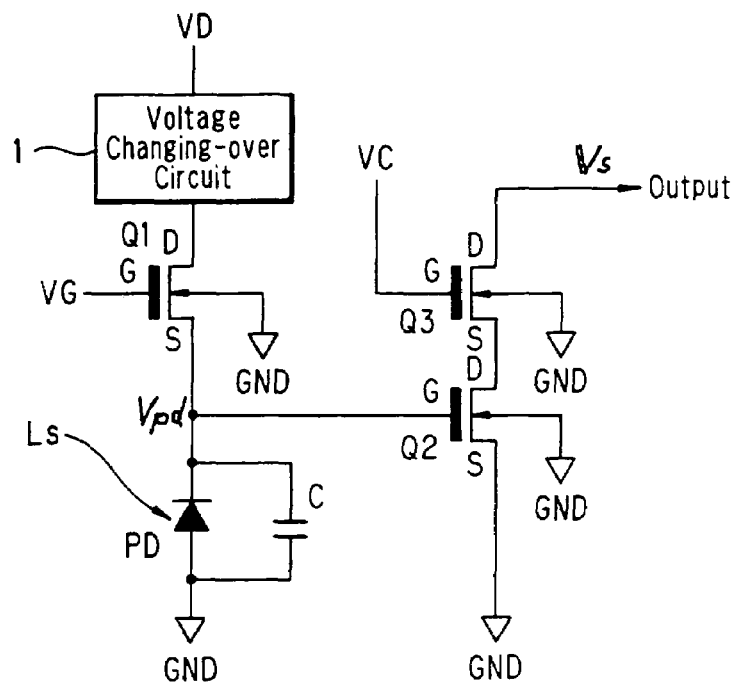
FIG. 15 is an electric circuit diagram of another embodiment of a light sensor circuit according to the present invention.

FIG. 15 shows another embodiment of a light sensor according to the present invention. This light sensor circuit comprises a photo-diode PD serving as a photoelectric converting element for producing a photo current Ip proportional to a quantity of incident light Ls falling thereon, a transistor Q1 having a logarithmic output characteristic in a weak inverse state for converting the photo current produced in the photodiode PD into a voltage signal Vpd, a transistor Q2 for amplifying the converted voltage signal Vpd with a high impedance and a transistor Q3 for outputting a pixel signal at a timing pulse of a pixel-signal reading-out signal Vs. Transistors Q1 to Q3 are of n-MOS type. In FIG. 15, C designates a parasite capacitor composed of the junction capacitance and the wiring capacitance of the photodiode PD. The light sensor circuit is provided with a voltage switching-over circuit 1 for changing a drain voltage VD of the transistor Q1 to a level lower than a normal and keeping it thereat for a specified period to remove an electric charge remaining in a parasite capacitor C of the photodiode for initialization thereof before detecting incident light falling thereon.

Figure 16:
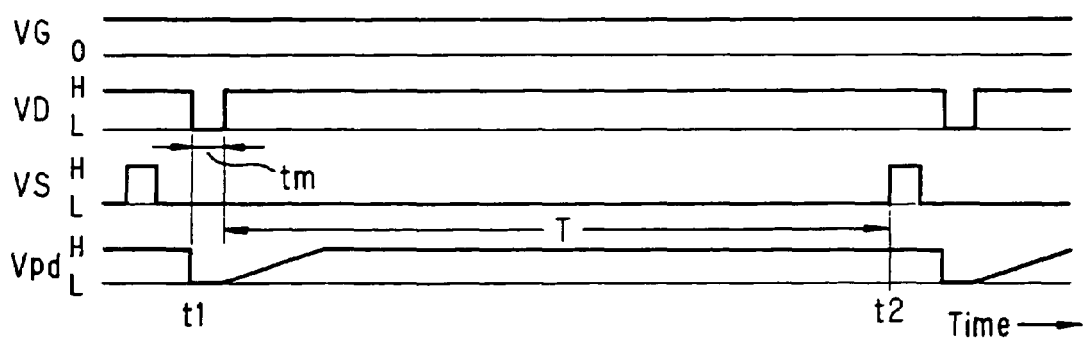
FIG. 16 is a time chart of signals produced at respective portions of the light sensor circuit shown in FIG. 15.

FIG. 16 shows a time chart of signals produced at respective portions of the light sensor circuit of FIG. 15. In FIG. 16, t1 is an initializing timing pulse and t2 is a light-signal detection timing pulse. A specified time tm for which the drain voltage VD of the transistor Q1 is switched from a normal value (high level H) to a low voltage (low level L) and kept thereat is set for example to about 5 microseconds in case of reading a pixel at a speed of about 100 nanoseconds. In FIG. 16, T designates a period for accumulating a charge in a parasitic capacitor C of the photodiode PD, which period is about 1/30 (or 1/60) seconds for a NTSC signal.

Figure 17:
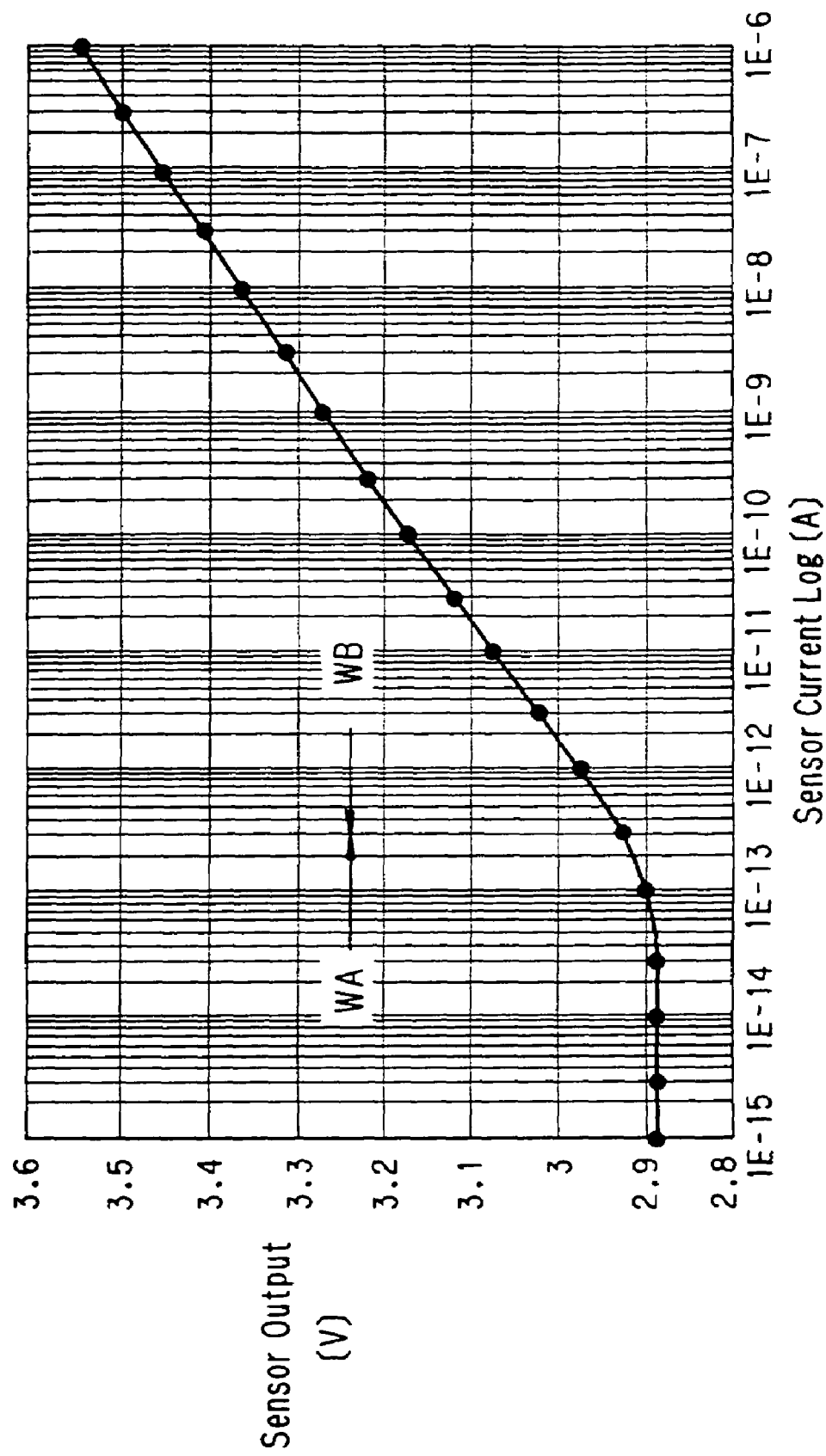
FIG. 17 shows an output characteristic of a pixel signal versus a photocurrent of the light sensor circuit shown in FIG. 15.

As shown in FIG. 17, output characteristic of the light sensor circuit is logarithmic at a sufficient photo current produced in the photodiode in accordance with a quantity of light falling on the photodiode PD. However, the output characteristic of the same light sensor circuit is substantially linear, not logarithmic, at a small value of the photo current because of the delayed response when charging the parasite capacitor C of the photodiode PD. In FIG. 17, WA indicates the non-logarithmic response region and WB indicates the logarithmic response region.

Figure 18:
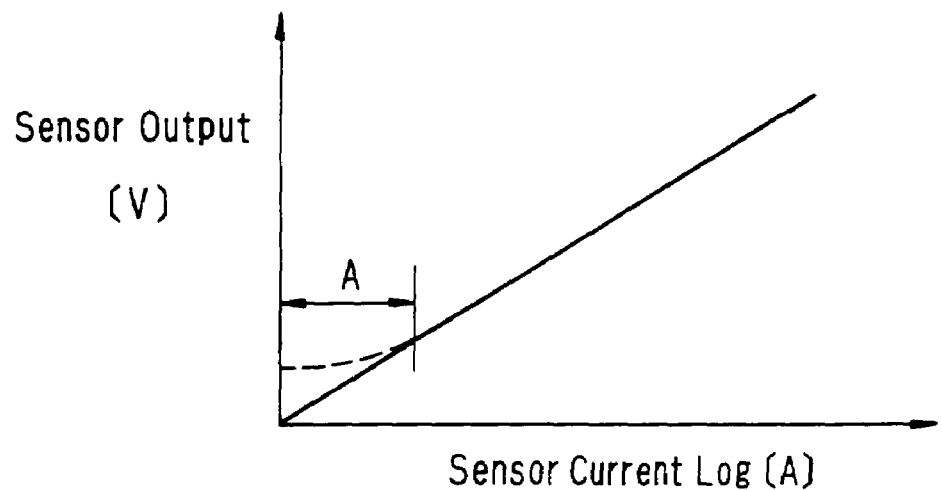
FIG. 18 shows an output characteristic of the light sensor circuit of FIG. 15 without initialization of the circuit.

The operation of the transistor Q1 with a logarithmic output characteristic is as follows:

When the transistor with a gate voltage VG fixed to a constant value was driven in a weak inverse state, an electric charge produced by incident light Ls is discharged to the drain D in a sub-threshold region of the transistor attaining a complete logarithmic output characteristic as shown in FIG. 18.

Figure 19:
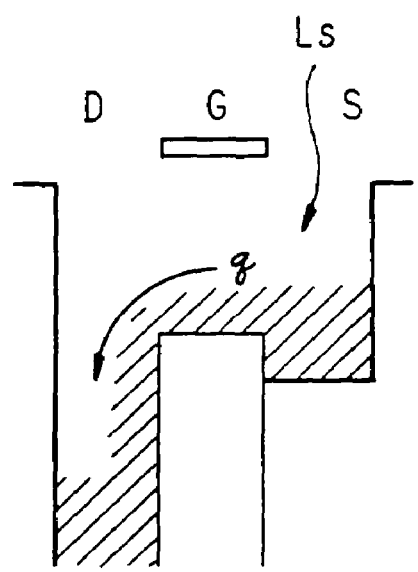
FIG. 19 is a mimic illustration of an exemplary operating condition of a logarithmic conversion transistor with a flow of an electric charge corresponding to a quantity of incident light to the light sensor circuit of FIG. 15.
Figure 20:
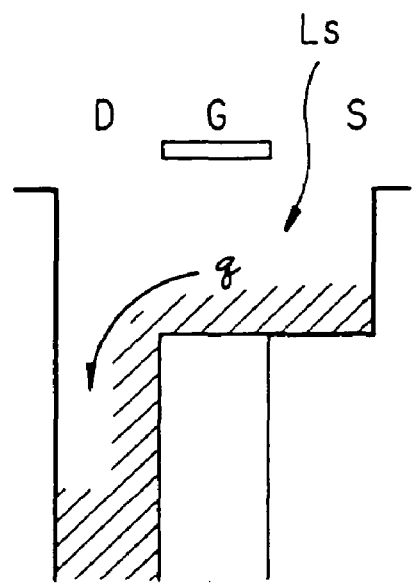
FIG. 20 is a mimic illustration of another embodiment of an exemplary operating condition of a logarithmic conversion transistor with a flow of an electric charge corresponding to a quantity of incident light to the light sensor circuit of FIG. 15.

FIGS. 19 and 20 are mimic illustrations of operating states of transistor Q1 with a flow of a charge q produced in accordance with a quantity of incident light.

Figure 21:
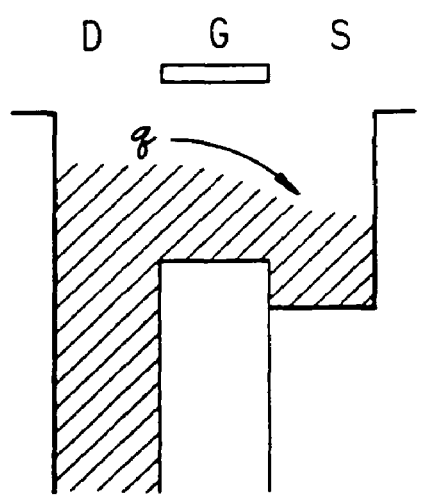
FIG. 21 is a mimic illustration of another embodiment of an exemplary operating condition of a logarithmic conversion transistor with a flow of an electric charge when initializing the light sensor circuit of FIG. 15.

Since the resistance of the transistor Q1 increases logarithmically with a small quantity of incident light, the discharging rate of the parasite capacitor C decreases, causing a capacitive afterglow due to a remaining charge. In that case, if there is a moving bright point in the dark background on a display screen, it exhibits a remarkable tailing phenomenon. In FIG. 18, A designates a region of the output characteristic, where an afterglow may appear in particular when the photocurrent changes from bright to dark. When the parasite capacitor C of the photodiode is charged by changing the drain voltage VD of the transistor Q1 to a value lower than the normal before detecting a light signal, a large amount of charge is newly injected to a charge remaining in the parasite capacitor. FIG. 21 schematically illustrates the operating state of the transistor Q1 with a flow of a charge q in the above instance. After initializing the light sensor circuit by removing the electric charge remaining in the parasite capacitor, the drain voltage VD of the transistor Q1 is restored to the normal value and, at the same time, recharging in accordance with the quantity of incident light Ls starts preventing the occurrence of an afterglow. As shown in FIG. 17, the logarithmic output characteristic is lost in a region WA with a small quantity of incident light but no afterglow occurs.

Figure 22:
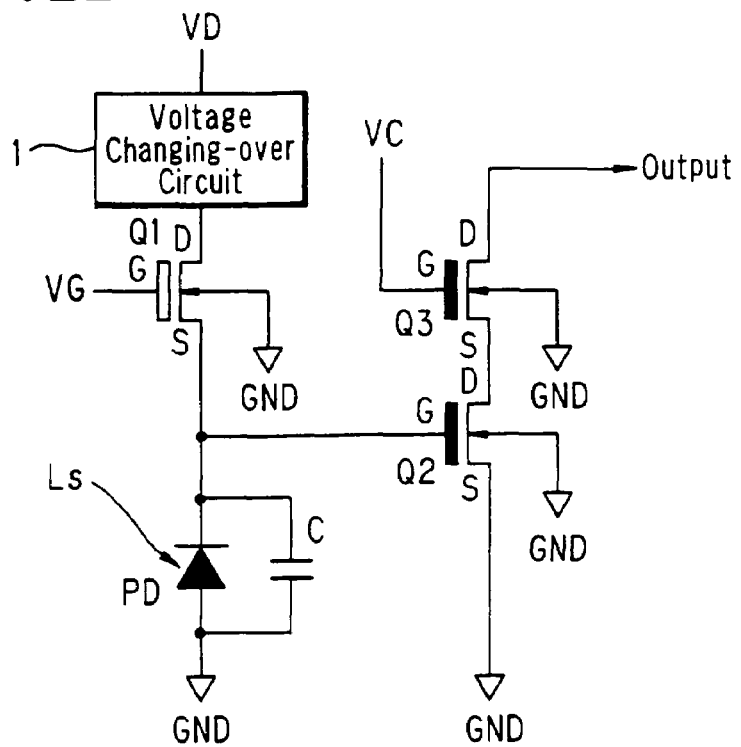
FIG. 22 is an electric circuit diagram of a light sensor circuit according to another embodiment of the present invention.

FIG. 22 shows another embodiment of a light sensor circuit according to the present invention, which uses n-MOS type transistors Q1 to Q3, among which the transistor Q1 is of depletion type. In this instance, the same effect as mentioned above can be obtained by zeroing (grounding) the drain voltage VD of the transistor Q1.

Figure 23:
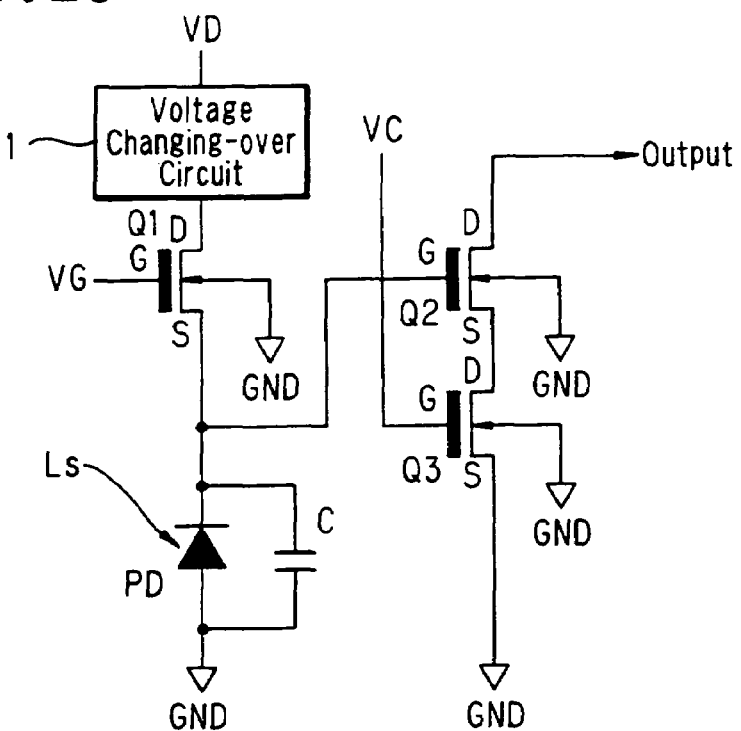
FIG. 23 is an electric circuit diagram of a light sensor circuit according to another embodiment of the present invention.

FIG. 23 shows another embodiment of a light sensor circuit according to the present invention, wherein n-MOS type transistors Q1 to Q3 are used in such an arrangement that the output transistor Q3 is disposed on the source side of the amplifying transistor Q2 which outputs a sensor signal from the drain side when the transistor Q3 is turned ON. In this light sensor circuit, as compared with the circuit of FIG. 15, a higher potential is needed at operating point for driving the transistor Q2, which can be achieved by increasing the gate voltage VG and the drain voltage VD of the transistor Q1. In this instance, the charging voltage of the photodiode PD increases, thereby the parasite capacitance of capacitor C is reduced and the response is improved.

Figure 24:
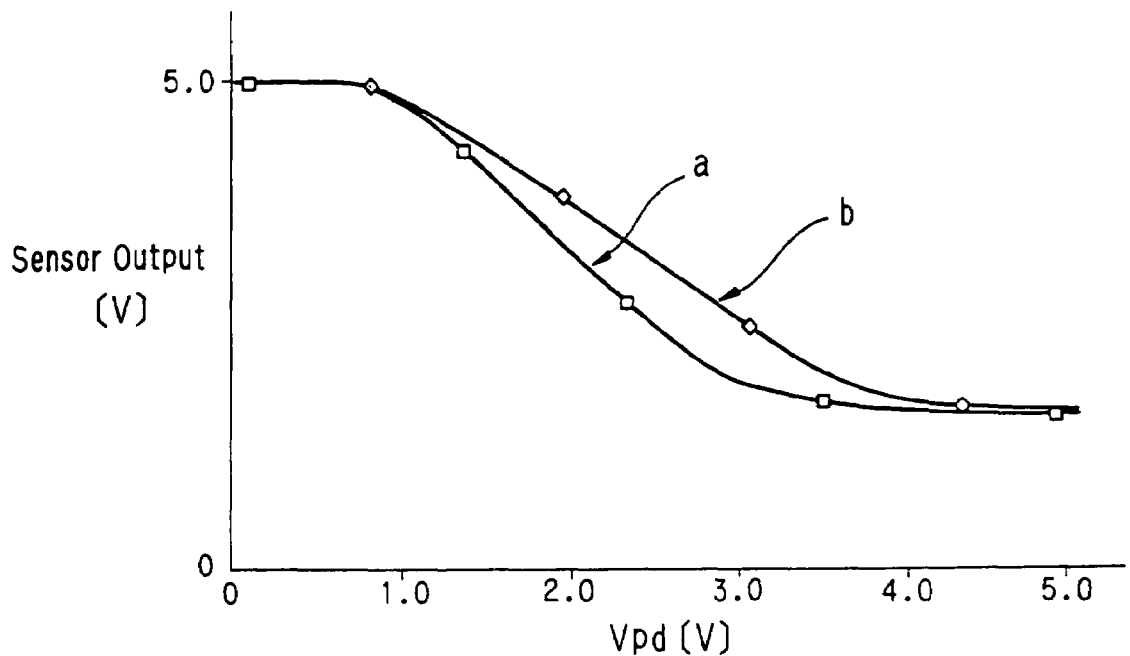
FIG. 24 shows output characteristics of sensor signals with respect to logarithmically converted voltage signals of the light sensor circuits of FIGS. 15 and 23 respectively.

FIG. 24 shows an output characteristic (a) of a sensor signal versus voltage signal Vpd (gate voltage of the transistor Q2) of the light sensor circuit of FIG. 15 and an output characteristic (b) of a sensor signal versus voltage signal Vpd (gate voltage of the transistor Q2) of the light sensor circuit of FIG. 23.

Figure 25:
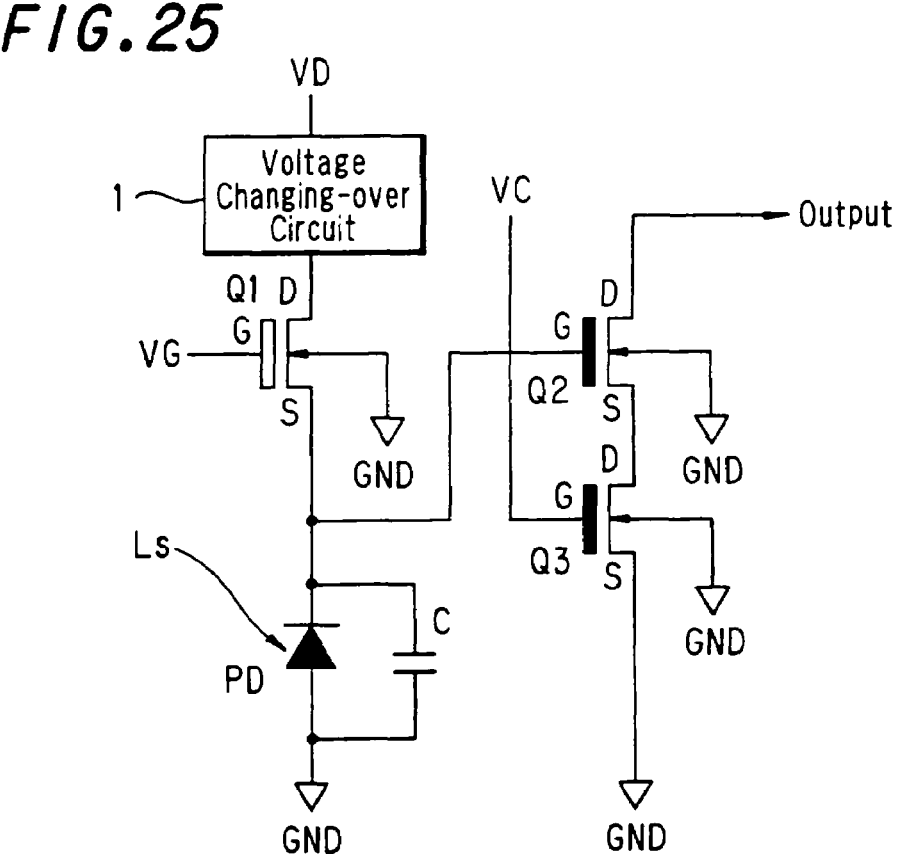
FIG. 25 is an electric circuit diagram of a light sensor circuit according to another embodiment of the present invention.

FIG. 25 shows another embodiment of a light sensor circuit according to the present invention, which has the same construction of FIG. 23 but uses a depletion type transistor at Q2. In this instance, the same effect as mentioned above can be obtained by zeroing (grounding) the drain voltage VD of the transistor Q1. This eliminates the need of providing a power source for the gate voltage VG.

Figure 26:
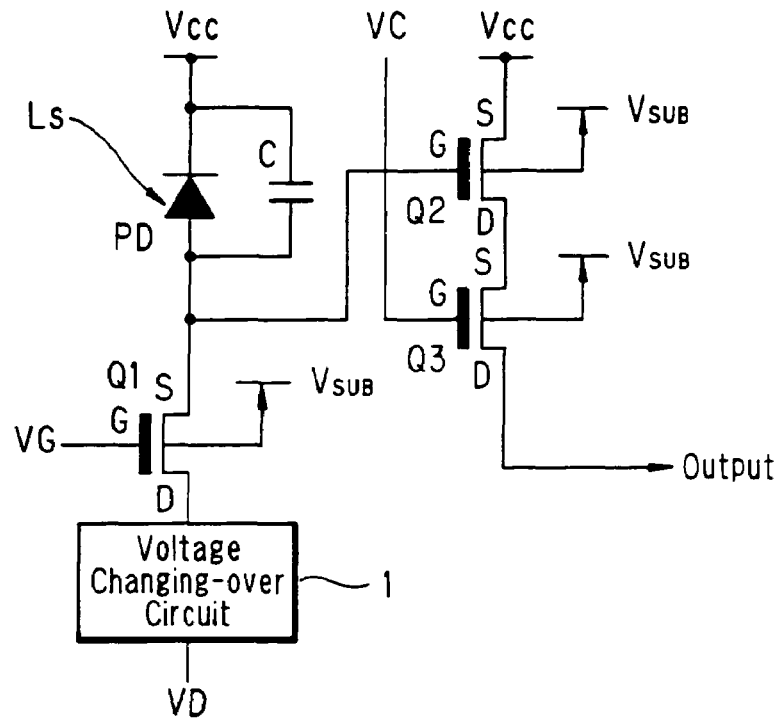
FIG. 26 is an electric circuit diagram of a light sensor circuit according to another embodiment of the present invention.

FIG. 26 shows another embodiment of a light sensor circuit according to the present invention, wherein transistors Q1 to Q3 are of p-MOS type.

Figure 27:
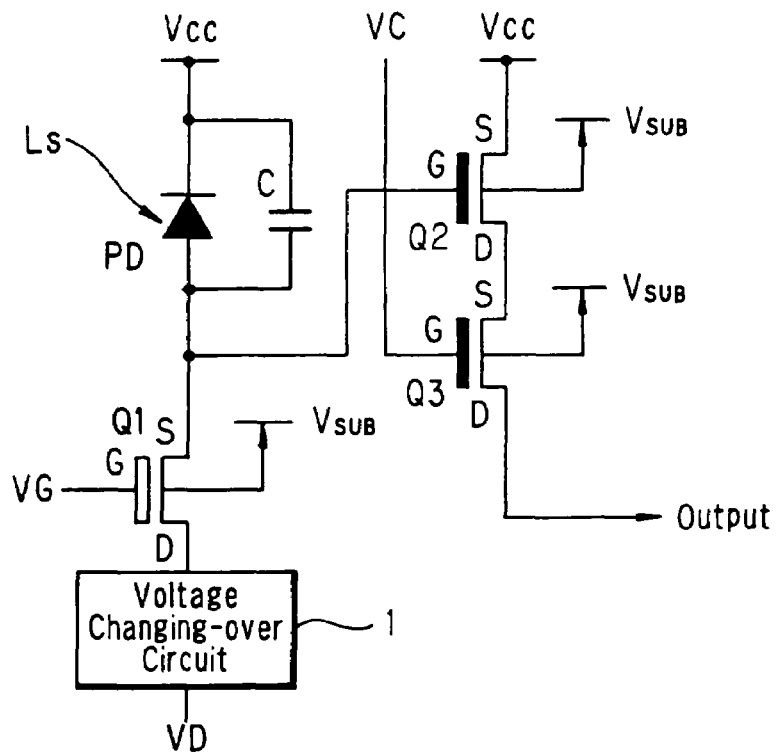
FIG. 27 is an electric circuit diagram of a light sensor circuit according to another embodiment of the present invention.

FIG. 27 shows another embodiment of a light sensor circuit according to the present invention, which has the same construction of FIG. 26 but uses a depletion type transistor as the component Q1. In this instance, the same effect as mentioned above can be obtained by zeroing (grounding) the drain voltage VD of the transistor Q1. This eliminates the need of providing a power source for the gate voltage VG.

Figure 28:
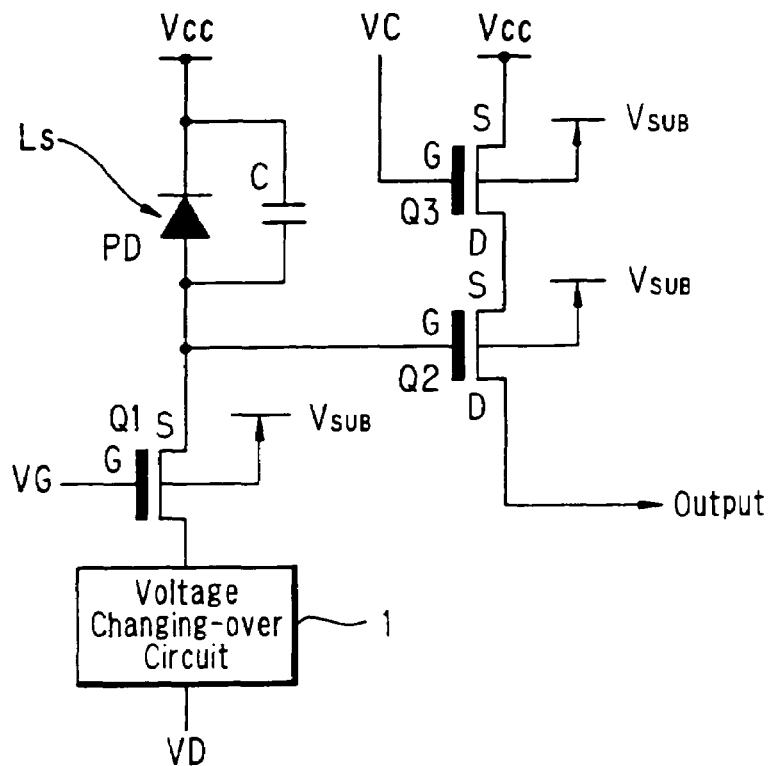
FIG. 28 is an electric circuit diagram of a light sensor circuit according to another embodiment of the present invention.

FIG. 28 shows another embodiment of a light sensor circuit according to the present invention, wherein p-MOS type transistors Q1 to Q3 are used in such an arrangement that the output transistor Q3 is disposed on the source side of the amplifying transistor Q2 which outputs a sensor signal from the drain side when the transistor Q3 is turned ON. In this light sensor circuit, as compared with the light sensor circuit of FIG. 16, a higher potential is required at an operating point for driving the transistor Q2, which can be achieved by increasing the gate voltage VG and the drain voltage VD of the transistor Q1. In this instance, the charging voltage of the photodiode PD increases, thereby the parasite capacitance of capacitor C is reduced and the response is improved.

Figure 29:
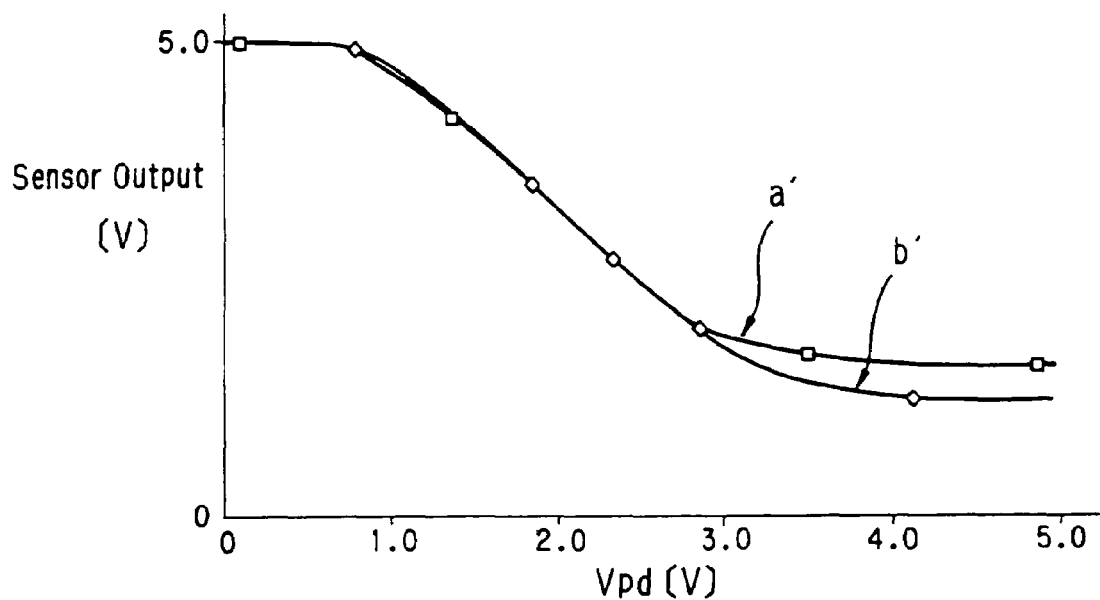
FIG. 29 shows output characteristics of sensor signals with respect to logarithmically converted voltage signals of the light sensor circuits of FIGS. 26 and 28 respectively.

FIG. 29 shows an output characteristic (a') of a sensor signal versus voltage signal Vpd (gate voltage of the transistor Q2) of the light sensor circuit of FIG. 15 and an output characteristic (b') of a sensor signal versus voltage signal Vpd (gate voltage of the transistor Q2) of the light sensor circuit of FIG. 26.

Figure 30:
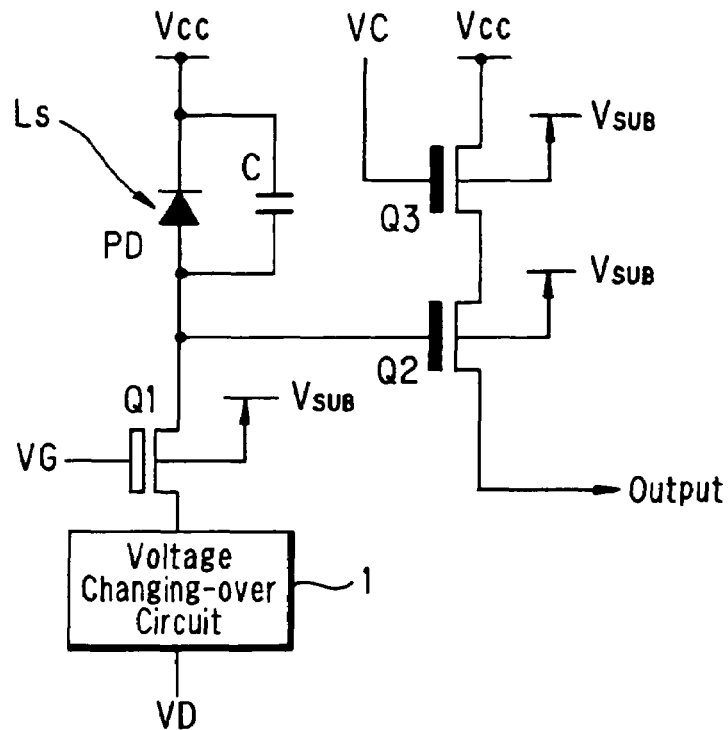
FIG. 30 is an electric circuit diagram of a light sensor circuit according to another embodiment of the present invention.

FIG. 30 shows another embodiment of a light sensor circuit according to the present invention, which has the same construction of FIG. 28 but uses a depletion type transistor at Q1. In this instance, the same effect as mentioned above can be obtained by zeroing (grounding) the drain voltage VD of the transistor Q1. This eliminates the need of providing a power source for the gate voltage VG. Switching-over of the drain voltage VD of the transistor Q1 by the voltage switching-over circuit 1 is conducted under control from an electronic control unit (ECU) of a whole system of an image sensor using a number of light sensor circuit each representing a unit pixel.

Figure 31:
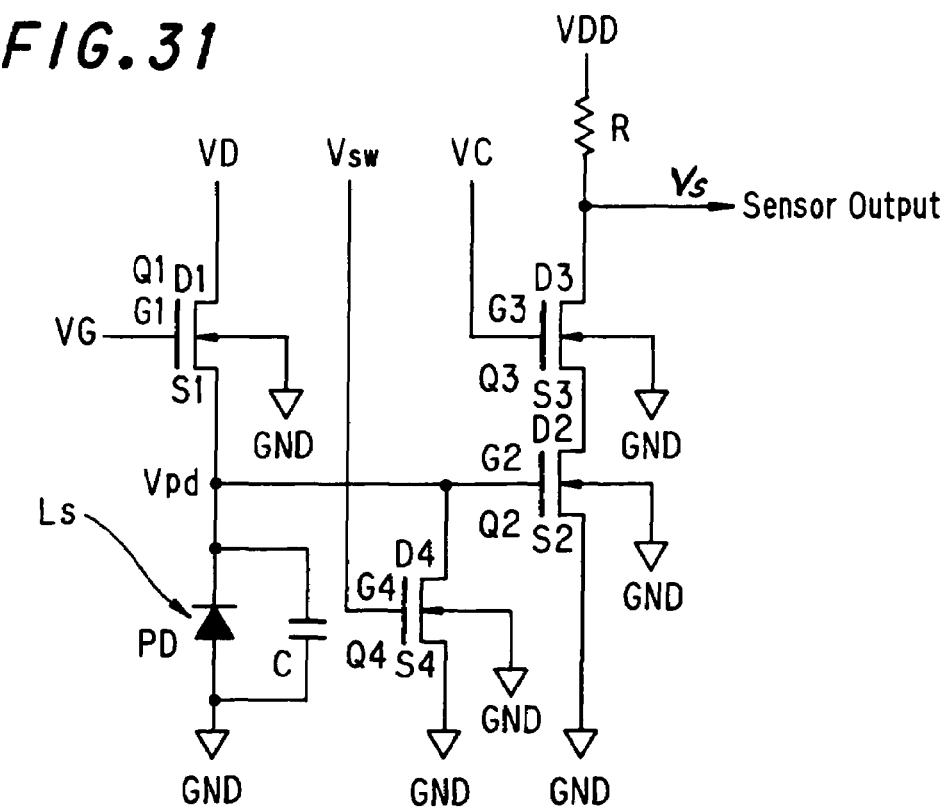
FIG. 31 is an electric circuit diagram of a light sensor circuit according to another embodiment of the present invention.

According to an aspect of the present invention, a light sensor circuit is basically constructed as shown in FIG. 31. This light sensor circuit comprises a photodiode PD operating as a photoelectric converting element for producing a photo current proportional to the quantity of incident light Ls falling thereon, a transistor Q1 having a logarithmic output characteristic in a weak inverse state for converting the photo current produced in the photodiode PD into a voltage signal Vpd, a transistor Q2 for amplifying the voltage signal Vpd and a transistor Q3 for outputting a sensor signal in accordance with a timing pulse of a readout signal Vs. In addition, the light sensor circuit is provided with a switching transistor Q4 which is turned on to allow the photodiode PD to be initialized before detecting a light signal by removing an electric charge remaining in its parasite capacitor or C.

Figure 32:
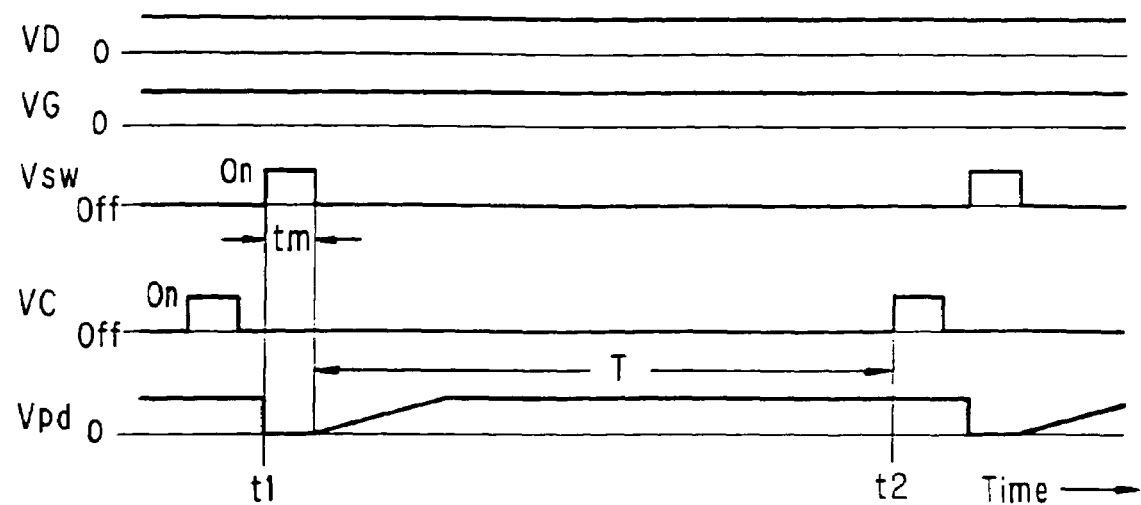
FIG. 32 is a time chart of signals produced at respective portions of the light sensor circuit shown in FIG. 31.

FIG. 32 shows a time chart of signals produced at respective portions of the light sensor circuit of FIG. 31. In the time chart of FIG. 32, t1 is an initializing timing pulse and t2 is a light-signal detection timing pulse. A specified time tm for which the transistor Q4 is turned on by turning on a switching voltage Vsw and kept in the ON state for removing the electric charge remaining in the parasite capacitor C of the photodiode is set for example to about 5 microseconds in case of reading a pixel at a speed of about 100 nanoseconds. In FIG. 32, T designates a period for accumulating a charge in the parasitic capacitor C of the photodiode PD, which period is about 1/30 (or 1/60) seconds for a NTSC signal.

The output characteristic of the light sensor circuit is logarithmic at a sufficient amount of the photo current produced in the photodiode in accordance with a quantity of light but it is substantially linear, not logarithmic, at a small amount of the photo current because of the delayed response when charging the parasite capacitor C of the photodiode PD.

Figure 33:
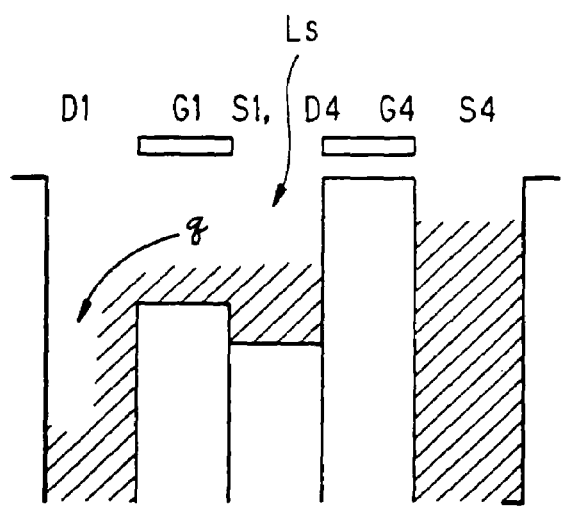
FIG. 33 is a mimic illustration of an exemplary operating condition of a logarithmic conversion transistor with a flow of an electric charge corresponding to a quantity of incident light to the light sensor circuit of FIG. 31.

FIG. 33 is a mimic illustration of operating states of transistor Q1 with a flow of an electric charge q for a charge-accumulating period T. In this case, the switching voltage Vsw of the transistor Q4 is a turn-off voltage and the transistor Q4 is in the turn-off state. The turn-off voltage Vsw (off) of the transistor Q4 is expressed as $Vsw(off) \leq VG(Q1)-Vth(Q1)-Vth(Q4)$ where $VG(Q1)$ is a gate voltage of the first transistor Q1, $Vth(Q1)$ is a threshold voltage of the first transistor Q1 and $Vth(Q4)$ is a threshold voltage of the fourth transistor Q4.

When the transistor Q4 is turned on to inject an electric charge into the parasite capacitor C of the photodiode PD before detecting a light signal, then a large amount of charge is newly added to a remaining charge in the parasite capacitor C.

Figure 34:
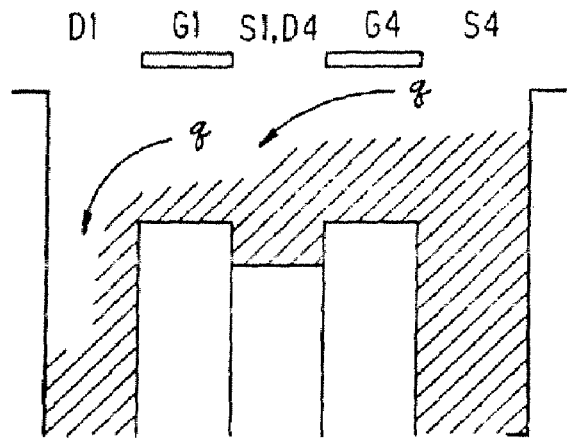
FIG. 34 is a mimic illustration of another embodiment of an exemplary operating condition of a logarithmic conversion transistor with a flow of an electric charge when initializing the light sensor circuit of FIG. 31.
Figure 35:
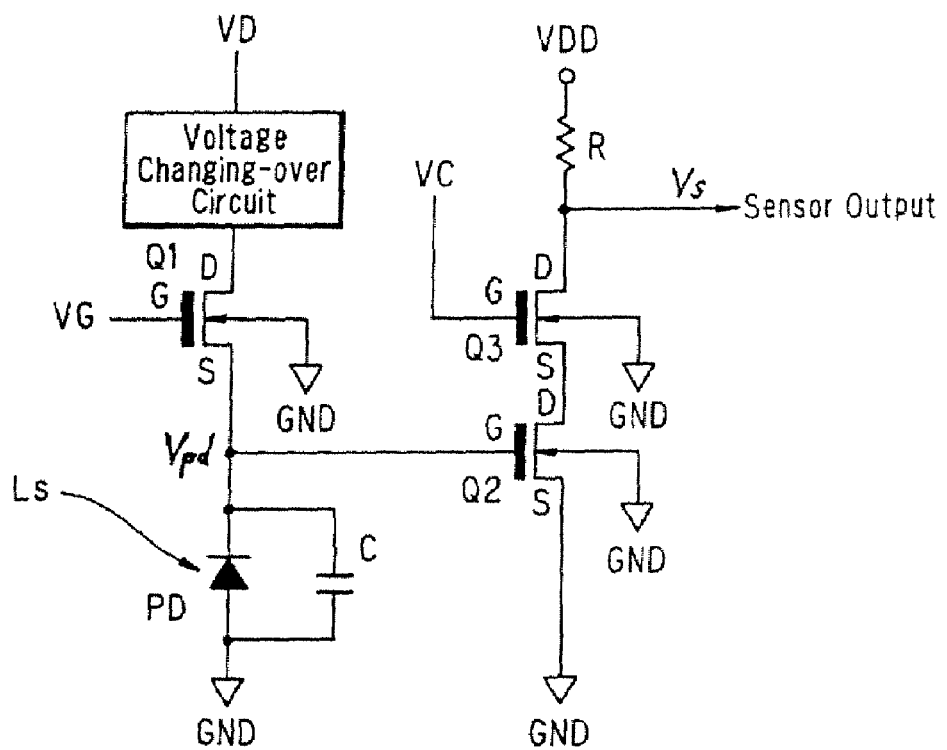
FIG. 35 is an electric circuit diagram of a conventional light sensor circuit.

FIG. 34 schematically illustrates the operating state of transistor Q1 with a flow of an electric charge q for that time. After initializing the light sensor circuit by removing the electric charge remaining in the parasite capacitor C, the transistor Q4 is turned off and, at the same time, recharging in accordance with the quantity of incident light Ls starts preventing the occurrence of an afterglow. As shown in FIG. 17, the logarithmic output characteristic is lost in a region WA with a small quantity of incident light but no afterglow occurs.

The light sensor circuit according to the present invention can initialize the photodiode PD before detecting a light signal by removing an electric charge remaining in the parasite capacitor C thereof by turning on the switching transistor Q4 and then detecting a light signal with no afterglow just after turning off the same transistor Q4. This means that the light sensor circuit can be initialized in a simpler and easier way in comparison with the conventional light sensor circuit which uses a specially provided switching-over circuit for step-by-step changing the power source with a low impedance to change the drain voltage VD of the transistor Q1 lower than a normal level for detecting a light signal to remove a charge remaining in the parasite capacitor C. Switching on and off of the transistor Q4 is carried out under the control of an electronic control unit (ECU) of a whole system of an image sensor comprising a number of these light sensor circuits each representing a unit pixel.

As is apparent from the foregoing, a light sensor circuit according to an aspect of the present invention comprises a MOS transistor having a logarithmic output characteristic in a weak inverse state for converting a photo current produced in a photoelectric converting element in accordance with a quantity of incident light into a voltage signal and a charge-coupled device (CCD) for transferring a charge in accordance with the voltage signal to output a signal charge, which is further provided with an initializing means for previously removing a charge remaining in a parasite capacitor of the photoelectric converting element and which can immediately follow an absurd change in the quantity of incident light and obtain a voltage signal corresponding to the changed quantity of incident light.

An image sensor composed of a number of these light sensor circuits each representing a unit pixel possesses a wide enough dynamic range to obtain a high quality image with no afterglow with a small quantity of incident light.

A light sensor circuit according to another aspect of the present invention, which comprises a photo-electric converting element for producing therein a photo current proportional to a quantity of incident light, a first transistor having a logarithmic output characteristic in a weak inverse state for converting the photo current produced in the photoelectric converting element into a voltage signal, a second transistor for amplifying with a high impedance the voltage signal, a third transistor for selectively outputting the amplified voltage signal and an initializing means for removing an electric charge remaining in a parasite capacitor of the photoelectric converting element before detecting a light signal. An image sensor comprising a number of these light sensor circuits each representing a unit pixel can possess a wide enough dynamic range to produce a high quality image with no afterglow with a small quantity of incident light.

A light sensor circuit according to another aspect of the present invention, which produces in an photoelectric converting element a photo current proportional to a quantity of incident light, converts the photo current into a voltage signal by using a sub-threshold region characteristic of a transistor having a logarithmic output characteristic in a weak inverse state and produces a sensor output corresponding to the voltage signal and which is provided with a simple initializing means representing a switching transistor with is turned on and off to charge and discharge a parasite capacitor of the photoelectric converting element before detecting a light signal. An image sensor comprising a number of these light sensor circuits each representing a unit pixel can possess a wide enough dynamic range to produce a high quality image with no afterglow with a small quantity of incident light.

The invention claimed is:

1. A light sensor circuit working by producing in a photoelectric converting element a photo current proportional to a quantity of light falling thereon and converting the photo current into a voltage signal by using a sub-threshold region characteristic of a transistor having a logarithmic output characteristic in a weak inverse state and outputting a sensor signal corresponding to the converted voltage signal, wherein said light sensor circuit is provided with a switching transistor for charging/discharging a parasite capacitor of the photoelectric converting element and an electric charge remaining in the parasite capacitor is removed by turning on the switching transistor before detecting a light signal by the photoelectric converting element, and wherein a turning-off voltage Vsw(off) of the switching transistor is expressed as Vsw(off)≦VG(Q1)−Vth(Q1)−Vth(Q4) wherein VG(Q1) is a gate voltage of the transistor for logarithmic characteristic conversion, Vth(Q1) is a threshold voltage of the transistor for logarithmic characteristic conversion and Vth(Q4) is a threshold voltage of the switching transistor.

* * * * *